Sept. 29, 1959  J. R. WEST  2,906,393
HARVESTING MACHINE
Filed July 1, 1957  3 Sheets-Sheet 2
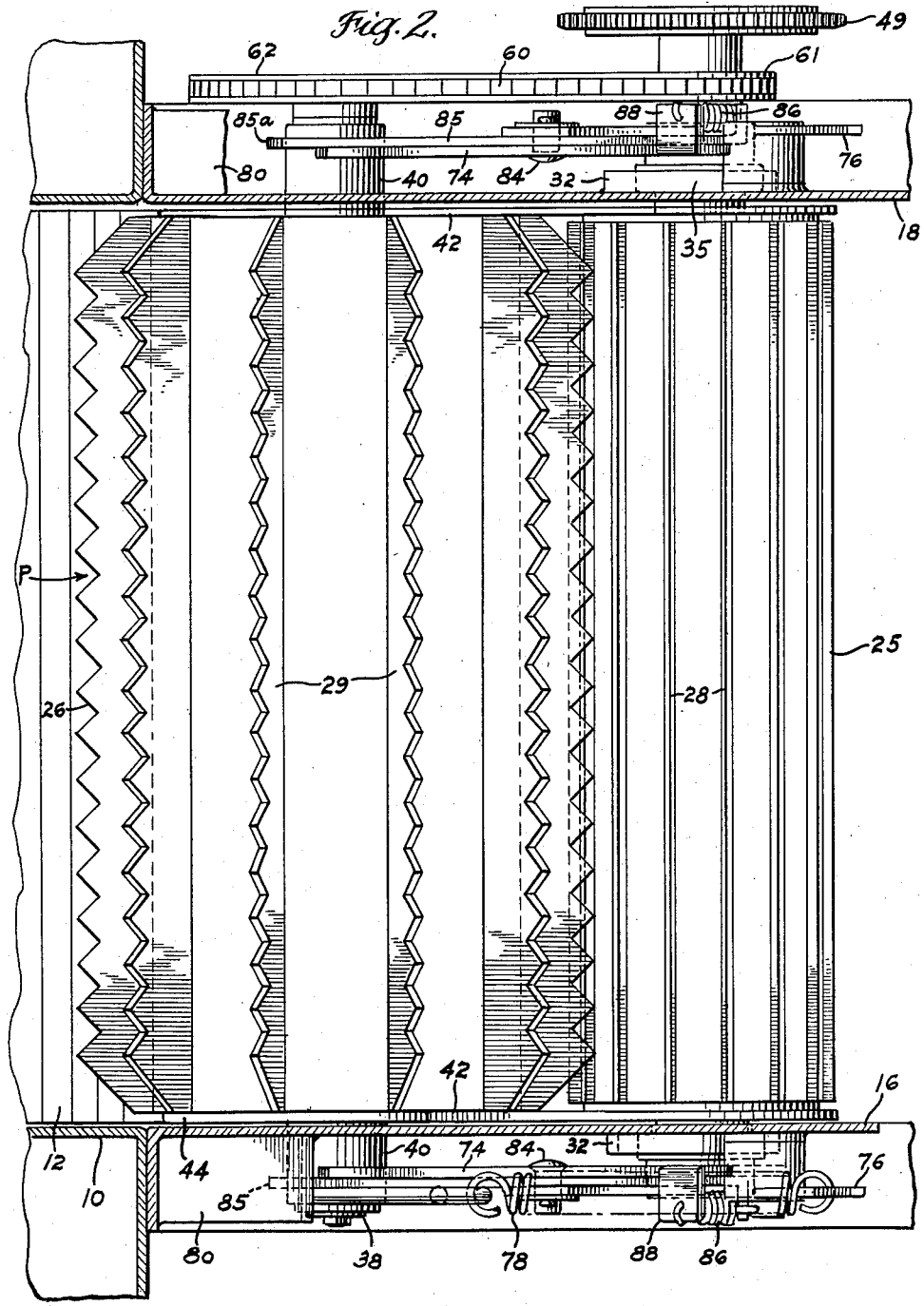
INVENTOR
JAMES R. WEST
Joseph Allen Brown
ATTORNEY Sept. 29, 1959  J. R. WEST  2,906,393
HARVESTING MACHINE
Filed July 1, 1957  3 Sheets-Sheet 3
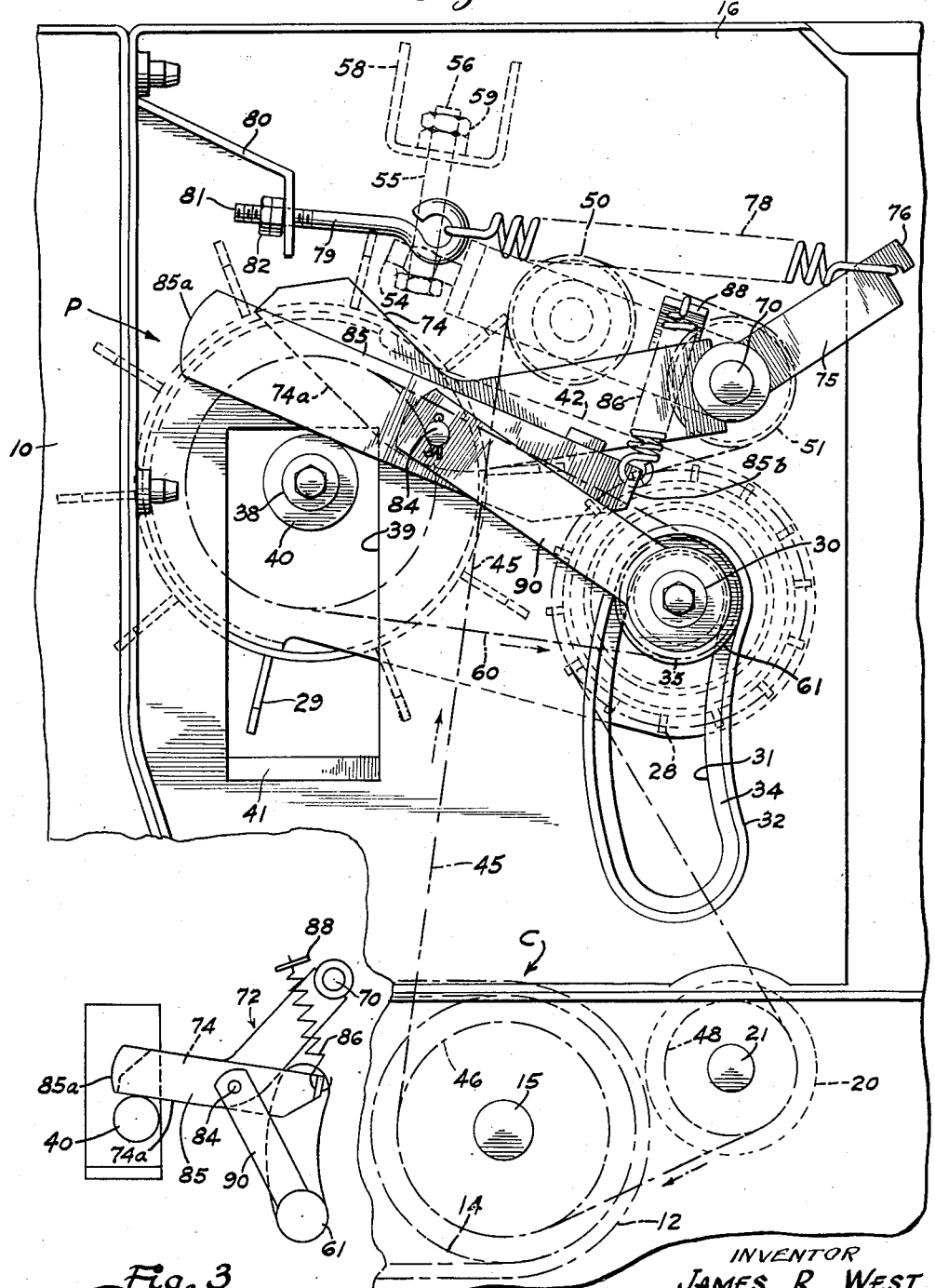
INVENTOR
JAMES R. WEST
Joseph Allen Brown
ATTORNEY United States Patent Office 2,906,393
Patented Sept. 29, 1959

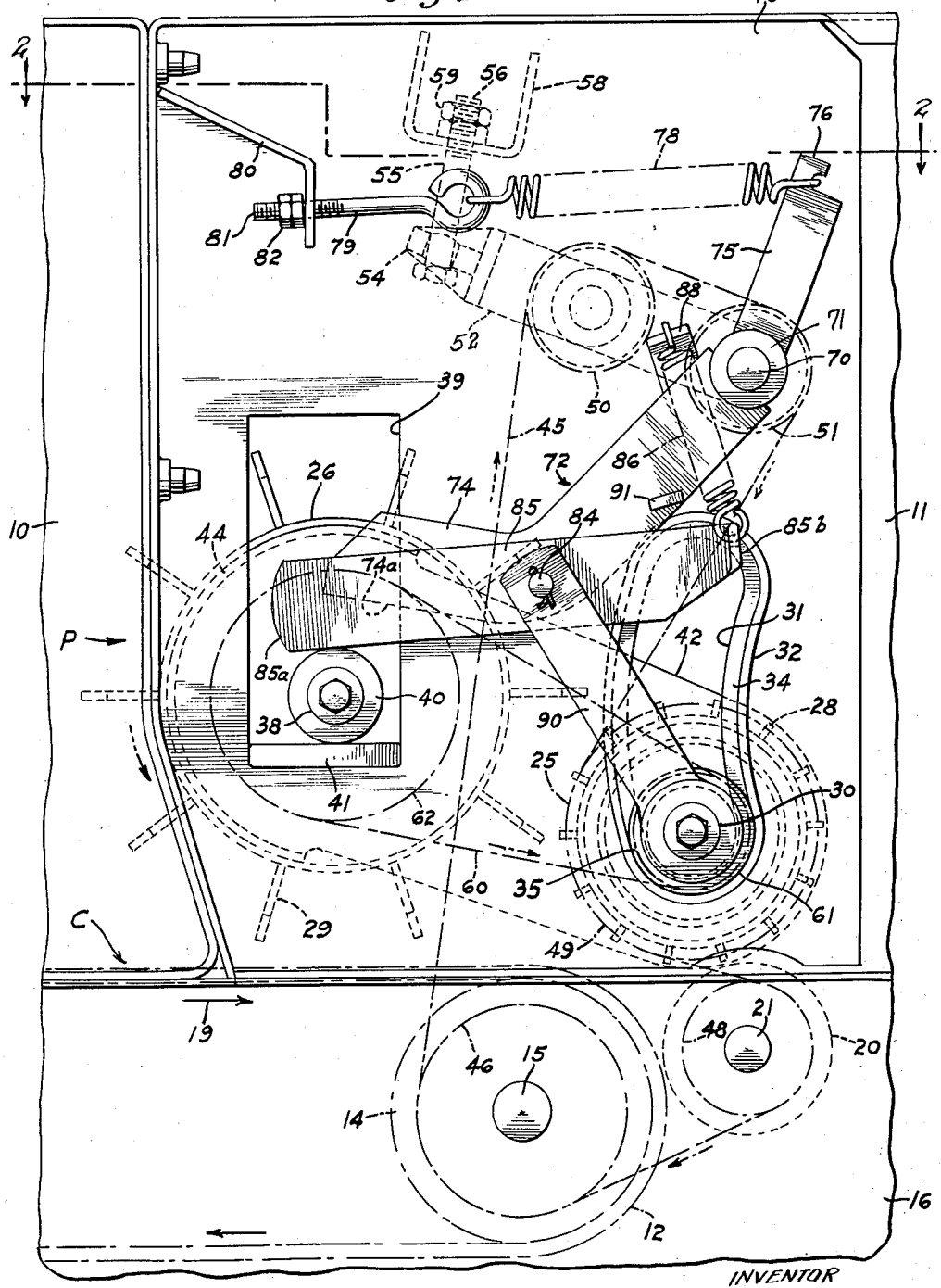

2,906,393
HARVESTING MACHINE

James R. West, New Holland, Pa., assignor to Sperry Rand Corporation, New Holland, Pa., a corporation of Delaware Application July 1, 1957, Serial No. 669,086

11 Claims. (Cl. 198—167)

The present invention relates generally to harvesting machines and more particularly to forage harvesters. Still more specifically the invention relates to a control means for regulating the operation of a "presser unit" of the type shown and described in my U.S. Patent No. 2,735,469, issued February 21, 1956.

When a mobile forage harvester is operated in the field, the delivery of crop material to the chopping and blowing mechanism varies considerably due to different crop conditions. In a given field, the stream of material entering the harvester may vary from very light to extremely heavy. Heretofore, it has been practiced to pre-compress the severed crop material into a horizontal ribbon for passage over a stationary shear bar. A rapidly rotating cutter may then conveniently chop the material into short lengths which can be conducted by an air stream through a discharge spout and into a trailing wagon. Because of the feeding variations, it is necessary that the pre-compressing means be variable responsive to the volume of material being delivered. Heretofore, co-operative lower and upper feed rolls have been provided between which crop material may pass, the lower roll being rotatable on a fixed horizontal axis while the upper roll is normally disposed and rotatable in a given position spaced above the lower roll but is floatable and displaceable upwardly responsive to the volume of material passing between the rolls. In some machines, only the weight of the "floating" upper roll is relied upon to provide the pre-compressing force. In other machines, spring means is provided to increase hold-down force.

In my U.S. Patent No. 2,735,469, the "presser unit" comprises a pair of floating upper rolls rotatable to assist the inward feed of material. The arrangement is such that the front roll may float upwardly a given amount while the rear roll remains "down." Thereafter, both rolls may raise as a unit.

One object of this invention is to provide a novel control means for downwardly biasing a presser unit of the type shown in my aforementioned patent.

Another object of this invention is to provide control means for a presser unit whereby the unit is held down by a given force until it is raised by crop material a predetermined amount, the unit being thereafter held down by a greater force.

Another object of this invention is to provide control means for a presser unit having a front and a rear roll, the front roll being movable upwardly a pre-determined distance while the rear roll is held down, and after said pre-determined distance is reached, both rolls move upwardly in unison, said control means being operative to hold down the front roll with a given force when the front roll alone is being elevated and with a greater hold-down force when the rear and front rolls move together.

Another object of this invention is to provide a control means of the character described having tension springs which restrain the floating movement of rolls of a presser unit wherein the rolls are shiftable a considerable amount, the structure employed being such that the amount of extension of the springs is small relative to the distance the rolls move.

A further object of this invention is to provide control means of the character described which occupies only a small amount of space in the forage harvester, being conveniently situated for ready assembly and repair.

A still further object of this invention is to provide control means of the character described which is made up of simple parts which can be manufactured at low cost and easily assembled.

Other objects of this invention will be apparent hereinafter from the specification and from the recital in the appended claims.

In the drawings:

Fig. 1 is a fragmentary, side elevation of the infeed section of a forage harvester, such section having a presser unit controlled by means constructed according to one embodiment of this invention. In this figure, the presser unit is shown in a "down" position.

Fig. 2 is a section taken on the line 2—2 of Fig. 1 and looking in the direction of the arrows. In this view, certain parts of the driving mechanism employed are eliminated to more clearly illustrate the pertinent structure of applicant's invention.

Fig. 3 is a fragmentary generally diagrammatic view on a reduced scale showing the control means of this invention in an intermediate position of operation; and, Fig. 4 is a view similar to Fig. 1 showing the presser unit at its uppermost point and the control means therefor at the limit of its operative range.

Referring now to the drawings by numerals of reference, C denotes an endless conveyor operative to move crop material from a pick-up and infeed mechanism contained in a housing 10 to a cutter blower mechanism contained in a housing 11. The pick-up and infeed mechanism may be similar to that shown and described in my U.S. patent application Serial No. 453,902, filed September 2, 1954, now Patent No. 2,800,217. The cutter and blower mechanism may be similar to that shown in my U.S. Patent No. 2,735,469, previously referred to.

Conveyor C comprises an endless transversely slatted apron 12 trained around a pair of spaced parallel rolls, one of which, 14, is shown. Roll 14 has stub shafts 15 at either end suitably journaled in spaced side walls 16 and 18 between which crop material is adapted to be delivered. The endless conveyor travels as indicated by the arrow 19 in Fig. 1.

Disposed inwardly of conveyor C and operative to pick up material as it leaves the conveyor and deliver it rearwardly to the chopper blower mechanism contained in the housing 11, is a lower roll 20 rotatable clockwise (Fig. 1) about a fixed axis. Roll 20, like conveyor roll 14, has stub shafts 21 journaled in side walls 16 and 18.

When the forage harvester is in operation, crop material is generally piled high on conveyor C as it is moved from left to right in Fig. 1. In order to pre-compress such material into a horizontal ribbon so that it may be readily acted upon by the cutting mechanism, a presser unit P is provided.

Unit P comprises a pair of spaced parallel rolls, namely, rear roll 25 and front roll 26. The rear roll is rotatable in a horizontal plane below forward roll 26. Also, the rear roll is of considerably smaller diameter than the front roll. Both rolls have peripheral, transverse ribs denoted 28 and 29 on the rear and front rolls, respectively. The ribs 29 are preferably serrated, as shown in Fig. 2, to provide an aggressive downward and rearward feeding action.

Rear roll 25 is carried on a cross-shaft 30 the ends of which project through vertically extending arcuate slots 31 in the side walls 16—18. Each slot 31 is surrounded by a flange 32 affixed to the outside of its respective side wall to thereby form an external guide track 34. Shaft 30 has a bearing-roller 35 at each end which abuts against the outside face of its adjacent side wall and is rollable in its associated guide track. The slotted structure in each side wall is identical, and the slots are in lateral register.

Front roll 26 is carried on a cross-shaft 38 the ends of which project through vertically extending rectangular openings 39 in the side walls 16—18. Each end of shaft 38 has a bearing-roller 40 which normally seats on a ledge 41 at the lower end of its associated opening. The openings 39 in the side walls are likewise in lateral register.

The rear and front rolls are connected by plates 42 which permit free relative rotation of the rolls but maintain the axes of the rolls at a fixed distance. The ends of each plate 42 connected to roll 26 are provided with lateral flange portions 44 (Fig. 2) which tuck inside roll 26 and resists the passage of material between the presser unit and the side walls 16—18.

Conveyor C, lower roll 20, and the rear roll 25 of presser unit P are driven by an endless chain 45 adjacent side wall 18 (Figs. 1 and 4). Chain 45 is trained around a sprocket 46 connected to conveyor roll 14, sprocket 48 for lower roll 20, sprocket 49 for rear roll 25 and a pair of idler sprockets 50 and 51. The idler sprockets are carried on a mounting 52 supported for pivotal movement about the axis of idler sprocket 51. The opposite end of the mounting 52 has an ear 54 through which an upwardly projecting bolt 55 extends. The threaded end 56 of bolt 55 extends through a bracket 58 welded or otherwise affixed to side wall 18. Lock nuts 59 adjustably secure bolt 55. It will be apparent that by adjusting bolt 55 the tightness of endless chain 45 may be adjusted.

Front roll 26 is driven from the rear roll 25 through an endless chain 60 (Figs. 1, 2 and 4) trained around sprockets 61 and 62 connected to rolls 25 and 26, respectively.

The power source for driving the infeed conveyor, lower roll 20 and presser unit P is not shown. However, preferably the power input is through shaft 15 of the conveyor C.

On each side wall 16—18 there is provided control means constructed according to this invention for biasing presser unit P downwardly. The biasing means comprises separate units on either side of the machine. Since the means provided on one side wall is identical to the means provided on the other side wall, only the arrangement on side wall 16 will be described.

Affixed to side wall 16 is a pivot pin 70 on which a bearing 71 is rotatable. Rigidly affixed to bearing 71 is a lever 72 comprising a lower L-shaped arm portion 74 and an upper straight arm portion 75 having a hook 76 at its upper end. Connected to hook 76 is one end of a tension spring 78, the opposite end of which is connected to an eye-bolt 79 extending through a bracket 80 affixed to side wall 16. Eye-bolt 79 has an end 81 on which lock-nuts 82 are threaded to provide for axial adjustment of the bolt to thereby regulate the tension of spring 78. As will be apparent, spring 78 biases lever 72 in a counter-clockwise direction (Fig. 1) about pivot pin 70.

Pivotally connected by a pin 84 at the elbow of lower arm 74 is a hold-down arm 85 having an end 85a forwardly of pivot 84 which engages the top of bearing roller 40 of front roll 26 and a flanged rear end 85b to which one end of a tension spring 86 is connected. The opposite end of spring 86 is connected to a bracket 88 welded to lever 72.

Also pivotally connected at 84 to arm 74 is a second hold-down arm or link 90. The end of arm 90 opposite the pivot is suitably connected to rear roll 25.

It will be seen from Fig. 1 that the lower edge 74a of the free end of arm 74 of lever 72 is spaced vertically from bearing roller 40 of roll 26. Also, there is provided on arm 74 a stop member 91 comprising a piece welded to the arm and projecting outwardly to overlie hold-down arm 85.

*Operation*

Rear roll 25 is biased downwardly by spring 78 through lever 72 (arms 75 and 74) and hold-down arm 90. Front roll 26 is biased downwardly by spring 86 through hold-down arm 85 pivoted on pin 84. As shown, spring 78 is considerably larger than spring 86. Preferably, it is about four times as strong as spring 78. The full force of spring 78 is directed against rear roll 25. Due to the fulcrum arrangement provided for arm 85 (approximately a 2–1 ratio) a downward force is exerted on front roll 26 of about twice the force of spring 86, but still only about half the downward force on roll 25 exerted by spring 78.

With this structure, crop material being delivered by the conveyor C may raise the front roll 26 while being incapable of raising rear roll 25; and, the front roll is able to move up and down within a prescribed range independently of rear roll 25. When the front roll lifts, it moves in an arc about the axis of the rear roll (Fig. 3), being connected thereto via side connecting plates 42. All the while roll 26 forces the material downwardly and delivers it rearwardly. Rear roll 25 takes the material as it comes from roll 26 and compresses it further while delivering it rearwardly between itself and fixed lower roll 20.

When the incoming material is of such quantity that it raises front roll 26 until bearing roller 40 engages the lower edge 74a of arm 74 (Fig. 3), then the linkage arrangement becomes solid. Spring 86 is cancelled out and the front roll, as well as the rear roll, is now held down by the force of spring 78. In other words, up until bearing roller 40 engages edge 74a, front roll 26 is held down by spring 86. Thereafter, the hold-down force is about doubled, spring 78 now being effective against the front roll.

Any further lifting of front roll 26, that is, after it engages edge 74a, causes both rolls 25 and 26 to lift as a unit, such upward movement being possible until arm 85 engages stop 91 (compare Figs. 1 and 4).

The above structure has been found to produce outstanding feeding characteristics. The problem of clogging is substantially eliminated due to the wide range of operation of the pressing unit P. At first, the rear roll stays down and the front roll moves up and down under a moderate downwardly biasing force. Once the front roll raises to a pre-determined point of elevation, the downward force upon it greatly increases. At this point also, the rear roll rises with the front roll. Thus, when the feeding or delivery of material is moderate, a moderate hold-down force is applied to such material. If the quantity of material delivered becomes heavy, a much heavier hold-down force is applied to it. Thus with applicant's invention, the presser unit P varies its operation responsive to the volume of material being delivered at any given moment.

Applicant's structure accomplishes the desired objectives in a limited amount of space. Springs of relatively short length are employed. Moreover, the respective rolls of the presser unit are able to move a considerable distance while the spring means for biasing the rolls downwardly are extended a much smaller relative distance.

While the invention has been described in connection with a particular embodiment thereof, it will be understood that it is capable of further modification, and this application is intended to cover any variations, uses, or adaptations of the invention following, in general, the principles of the invention and including such departures from the present discolsure as come within known or customary practice in the art to which the invention pertains, and as fall within the scope of the invention or the limits of the appended claims.

Having thus described my invention, what I claim is:

1. In a harvesting machine a conveyor having a forward end and a rear end, means for driving said conveyor whereby crop material deposited on said forward end is moved toward said rear end, a pair of side walls, one along each lateral side of said conveyor and extending upwardly relative thereto, a floatable presser-unit between said side walls and above said conveyor and engageable with crop material thereon to compress such material as it is conveyed, said presser-unit comprising a front and a rear feed roll, means supporting said rolls on said side walls for vertical movement relative thereto and to said conveyor responsive to the quantity of material on the conveyor, a first resilient means biasing said front roll downwardly, a second resilient means biasing said rear roll downwardly, the biasing force of said second resilient means being greater than the biasing force of the first resilient means whereby a given amount of crop material may elevate said front roll without being able to lift said rear roll, and means for connecting said front and rear rolls when said front roll has been elevated to a predetermined point whereby further upward movement of said front roll causes a corresponding upward movement of said rear roll, said front roll upon connection with said rear roll being biased downwardly by said second resilient means.

2. A harvesting machine as recited in claim 1 wherein said presser-unit feed rolls are carried on shafts the ends of which project through vertically extending slots in said side walls, said first resilient means comprising a medially pivoted hold down arm, on each side wall, having one end engaging the top of one end of the front roll shaft and an end opposite said one end to which a tension spring is connected, and means for supporting said spring whereby the spring exerts an upward force on said opposite end.

3. A harvesting machine as recited in claim 2 wherein said second resilient means comprises a medially pivoted lever on each side wall having a tension spring connected to one end of the lever, and a link connecting said rear roll to said lever at a point adjacent the end of said lever opposite said one end.

4. A harvesting machine as recited in claim 3 wherein means is provided for regulating the tension of the spring connected to said lever.

5. A harvesting machine as recited in claim 4 wherein said hold down arm of said first resilient means is pivotal on a pin on said lever of said second resilient means, said link being connected to said lever by said same pin.

6. A harvesting machine as recited in claim 5 wherein said opposite end of said lever overlies the shaft of said front roll and is spaced vertically therefrom, said front roll being movable upwardly against the resistance of said hold down arm until it engages said opposite end of said lever whereupon it is held down by said lever and the tension spring connected thereto.

7. A harvesting machine as recited in claim 6 wherein a stop member is carried on said lever in a position for engagement with said hold down arm to limit the upward movement of both of said rolls.

8. A harvesting machine as recited in claim 7 wherein means is provided for maintaining the axis of the shafts of the respective feed rolls at a fixed distance whereby when said front roll is elevated by crop material relative to said rear feed roll, the front roll moves in an arc concentric with the axis of the rear feed roll, the slots through which the shaft of the rear roll project being arcuate, the arc of the slots for the shaft of said rear roll being such that when both of said rolls are elevated after engagement of said front roll shaft with said lever, said rolls are shifted forwardly and then rearwardly as they are elevated.

9. A harvesting machine as recited in claim 1 wherein means is provided for rotating said feed rolls in directions opposite to the direction of movement of said conveyor to thereby produce a feeding action therebetween, the down position of said front roll being higher than the down position of said rear roll whereby said rolls exert a progressive downward and rearward feeding action on the crop material on said conveyor, and each of said rolls having transverse, radial ribs, the outer edges of the ribs of said front roll being serrated and the outer edges of the ribs of the rear roll being rectilinear.

10. In a harvesting machine, a conveyor for delivering crop material from a forward station to a rearward station, a presser-unit disposed above said conveyor and engageable with the crop material conveyed thereon to compress such material, means mounting said presser-unit for vertical movement relative to said conveyor responsive to the quantity of material on the conveyor, said presser unit comprising a front and a rear feed roll, a first means biasing said front roll downwardly, a second means biasing said rear roll downwardly, said second biasing means being materially stronger than the first biasing means whereby said front roll is liftable with less force than is required to lift said rear roll, means connecting said front and rear rolls when the front roll has been elevated to a predetermined point whereby further upward movement of the front roll is accompanied by a corresponding upward movement of the rear roll and both rolls are biased downwardly by said second biasing means.

11. In a harvesting machine, a conveyor for crop material, a presser-unit disposed above said conveyor and engageable with the crop material conveyed thereon to compress such material, means mounting said presser-unit for vertical movement relative to said conveyor responsive to the quantity of crop material on the conveyor, means for biasing said presser-unit downwardly with a given force until the unit has been elevated to a predetermined point, and means for thereafter biasing the unit downwardly with a greater force.

References Cited in the file of this patent

UNITED STATES PATENTS

| | | |
|---|---|---|
| 1,358,302 | Ellis | Nov. 9, 1920 |
| 2,230,018 | Stronstad | Jan. 28, 1941 |
| 2,735,469 | West | Feb. 21, 1956 |